No. 639,002. Patented Dec. 12, 1899.
J. & W. TITUS.
SPROCKET WHEEL.
(Application filed June 19, 1899.)
(No Model.)
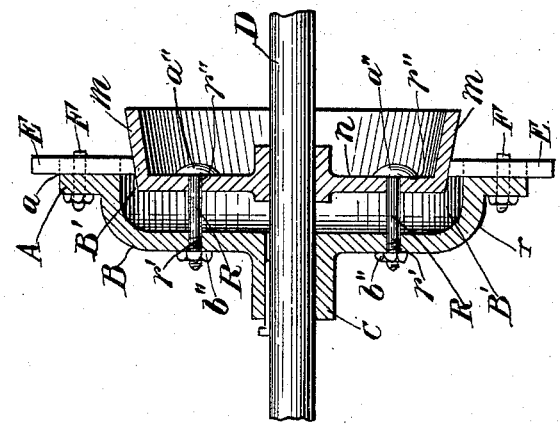
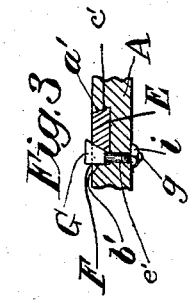
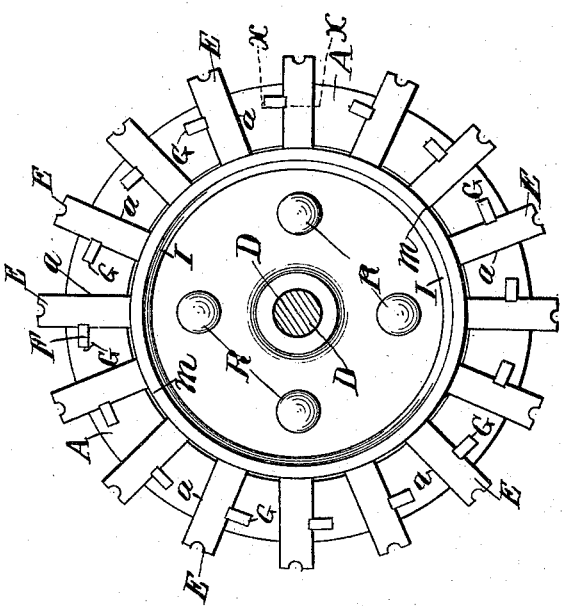
WITNESSES:
J. G. Angus
Louis Perlman
INVENTORS
John Titus
William Titus
BY
James A. Whitney
ATTORNEY

UNITED STATES PATENT OFFICE.

JOHN TITUS, OF OYSTER BAY, AND WILLIAM TITUS, OF NORTH HEMPSTEAD, NEW YORK.

SPROCKET-WHEEL.

SPECIFICATION forming part of Letters Patent No. 639,002, dated December 12, 1899.

Application filed June 19, 1899. Serial No. 721,038. (No model.)

*To all whom it may concern:*

Be it known that we, JOHN TITUS, a resident of Oyster Bay, and WILLIAM TITUS, a resident of Old Westbury, town of North Hempstead, in the county of Nassau and State of New York, citizens of the United States, have invented certain new and useful Improvements in Sprocket-Wheels; and we do hereby declare that the following is a full, clear, and exact description of the same, reference being had to the accompanying drawings, making a part of this specification, in which—

Figure 1 is a side view of a sprocket-wheel made according to our invention. Fig. 2 is a sectional view of the same. Fig. 3 is a detail sectional view taken in the line $x$ $x$ of Fig. 2 and in a plane at right angles to Figs. 1 and 2.

It is well known in the art of transmitting power and motion by chains and sprocket devices that the wear of the chain upon the sprocket-teeth gradually elongates the interior of the links of the chain, thereby lengthening the links in the operation of the apparatus out of unison with the sprocket-teeth, and thereby impairing and finally destroying the working of the mechanism.

The object of our invention is to provide against this drawback to the most successful use of sprocket-and-chain devices; and it comprises certain novel means whereby we provide for the adjustment at will of the sprocket-teeth, so that as the chain-links elongate or wear away the teeth may be extended to accurately compensate for such elongation of the links, and thereby maintain the unison and synchronism in the movements of the parts requisite to their successful operation.

A is a rim of a sprocket-wheel carried by a spider B, which may be composed of radial spokes or equivalent means for connecting the rim with the hub C, which in its turn is fast upon the usual or any suitable sprocket-shaft D. The spider is concave at one side, as shown in Fig. 1, for a purpose herein presently explained.

Formed radially in the rim A are sockets $a$. Each of these sockets has one of its lateral walls recessed inward or of semidovetail shape, as shown at $a'$ in Fig. 3. Its opposite side may be at right angles to its bottom, as shown at $b'$ in said figure. E are the sprocket-teeth. These are detachable and are placed in the sockets $a$. Each tooth is made sloping at its sides or lateral edges, so that one, $c'$, of said edges may fit the semidovetail lateral wall $a'$ of the socket in which it is placed, while the opposite of said edges, $b'$, operates in conjunction with a wedge or key G, presently herein described. Each socket is somewhat wider at its bottom than is the tooth which is placed therein. At the space F thus afforded at one edge of the tooth is provided a hole or bore $e'$, which is transverse to the face of the rim. Placed in the said space F is a wedge or tapering key G, which has a screw-shank $g$, which passes through the hole or bore and projects from the opposite side of the rim. Upon this screw-shank is placed a nut $i$. The key G has its sloping or wedge-like surface in contact with the adjacent sloping surface of the tooth, while its back rests against the right-angled side $b'$ of the socket. The parts being thus constructed and arranged, the tooth may be moved radially inward or outward, provided the key is loosened to permit such movement. When the tooth is thus adjusted to the required position, the wedge is tightened against the tooth, the sloping edge of the latter is crowded into the semidovetail side of the socket, while the wedge of the key not only crowds the teeth, as described, and by its strong frictional hold upon the tooth prevents its longitudinal movement, but being itself of semidovetail form operates in conjunction with the farther side of the socket to prevent the tooth from getting out of its place, the tooth being, so to speak, tightly dovetailed in position and gripped against displacement by any of the ordinary vicissitudes of use.

To enable the sprocket-teeth to be readily adjusted through the circumference of the rim, we provide an adjustable circular guide I, which is arranged concentric with the rim and in such relation with the inner ends of the adjustable sprocket-teeth that by first adjusting the guide to a proper position the said teeth may be brought in contact with the guide in such a manner that their distances from the axis of rotation of the wheel shall be practically uniform. As shown in Fig. 1, this guide is, so to speak, dish-shaped, with a central hub which encircles the sprocket-shaft D. The flaring circumference m of this guide projects into the circular space within the rim into the space afforded by the concave side of the spider herein previously described. The inner ends of the sprocket-teeth are concentric with this flaring circumference of the guide I, as indicated in Figs. 1 and 2. The web n, which connects the hub of the guide with its circumferential part m, has holes r'' in it, which are coincident with circular holes r' in the part r of the spider B of the sprocket-wheel. Bolts R are pushed through these holes and are provided with heads a'' and nuts b.'' These hold the guide firmly in its required position with reference to the sprocket-wheel and enable it to be adjusted at will to a greater or less distance within the circular space B'. When the guide is moved inward, its hub, movable along the shaft of the sprocket-wheel, crowds the teeth radially outward, the teeth being of course loosened to permit such movement. When the guide has been brought to the position which thus adjusts the teeth to the desired position, the inner ends of the teeth resting against the circumference of the guide, the teeth are tightened in their places by means of the keys or wedges, as hereinbefore explained. By the means described, therefore, a sprocket-wheel which by the wear of the links of its chain has become relatively too small in circumference to coöperate properly with thec hain may be brought up to an actual working circumference which fits it perfectly for coöperation with the elongated links of the chain. It may also be mentioned that as the guide may be retained in the position at which it regulates the adjustment of the teeth, as described, it provides an additional support to said teeth to assist in retaining them in position against the stress exerted upon them when the sprocket-wheel and its chain are in operation.

What we claim as our invention is—

1. The combination with the rim of a sprocket-wheel constructed with radial sockets, and a circular adjustable guide concentric with the axis of the sprocket-wheel and having its hub movable longitudinally upon the shaft of the latter, of radially-adjustable sprocket-teeth placed in the sockets with their inner ends coincident with the guide, means for retaining the guide at points to which it may be adjusted along the shaft and means for retaining the sprocket-teeth in the positions to which they may be brought by the guide, substantially as herein set forth.

2. The combination with the rim of a sprocket-wheel constructed with radial sockets, a dish-shaped guide concentric with the axes of the sprocket-wheel, and bolts for adjusting the guide, of adjustable sprocket-teeth placed in the sockets coincident with the flaring circumference of the said guide, and means for retaining the teeth in the positions to which they may be adjusted by the guide, substantially as herein set forth.

3. The combination with a rim of a sprocket-wheel constructed with radial semidovetail sockets, of adjustable sprocket-teeth placed in said sockets, and keys or wedges placed in the opposite sides of the sockets and arranged to crowd the teeth into the said semidovetail sides of the socket, and to retain said teeth in position, substantially as herein set forth.

4. The combination with a rim of a sprocket-wheel constructed with radial semidovetail sockets, adjustable sprocket-teeth placed in said sockets, and keys or wedges arranged to crowd the teeth against the dovetail sides of the sockets, of an adjustable dish-shaped guide concentric with the axes of the sprocket-wheel, bolts for adjusting said guide with reference to the ends of the sprocket-teeth extended outward from the rim, substantially as herein set forth.

5. The combination with a rim of a sprocket-wheel with semidovetail radial sockets, and with holes or bores extended transversely from said sockets, of adjustable dovetail radial sprocket-teeth placed in the sockets and narrower than the said sockets, and wedges constructed with screw-shanks passed through the bores or holes, and nuts on the said shanks for tightening the wedges to grip and retain in place the teeth in the sockets, substantially as herein set forth.

6. The combination with a rim of a sprocket-wheel constructed with semidovetail radial sockets, and with holes or bores extended transversely from said sockets, adjustable dovetail radial sprocket-teeth placed in the sockets, wedges constructed with screw-shanks passed through the transverse holes, and nuts on said screw-shanks for tightening the wedges upon the teeth, of a circular dish-shaped guide concentric with the axes of the sprocket-wheel, and extended within the rim, and bolts for adjusting the flaring circumference of said guide against the inner ends of the teeth and to connect said guide with the rim, substantially as herein set forth.

JOHN TITUS.
WILLIAM TITUS.

Witnesses:
WM. E. HAWXHURST,
MARGARET T. HAWXHURST.